(12) United States Patent
Nguyen et al.

(10) Patent No.: US 9,548,908 B2
(45) Date of Patent: Jan. 17, 2017

(54) FLOW DE-DUPLICATION FOR NETWORK MONITORING

(75) Inventors: Khanh V. Nguyen, Milpitas, CA (US); Naveen Kumar Tyagi, Fremont, CA (US); Ray M. Lau, Foster City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 922 days.

(21) Appl. No.: 13/591,080

(22) Filed: Aug. 21, 2012

(65) Prior Publication Data

US 2014/0059200 A1 Feb. 27, 2014

(51) Int. Cl.
*H04L 12/26* (2006.01)
(52) U.S. Cl.
CPC .................................. *H04L 43/026* (2013.01)
(58) Field of Classification Search
CPC ...................................................... H04L 43/026
USPC .......................................................... 709/224
See application file for complete search history.

(56) References Cited

U.S. PATENT DOCUMENTS

| | | | | |
|---|---|---|---|---|
| 843,408 | A * | 2/1907 | Merrill .................... | D05B 91/12 223/109 R |
| 7,562,303 | B2 * | 7/2009 | Sarma ..................... | H04L 67/22 715/733 |
| 7,657,626 | B1 * | 2/2010 | Zwicky .................. | G06Q 30/02 705/51 |
| 7,761,558 | B1 * | 7/2010 | Jindal .................... | H04L 67/303 709/223 |
| 8,190,835 | B1 * | 5/2012 | Yueh ..................... | G06F 3/0608 711/159 |
| 8,370,297 | B2 * | 2/2013 | Anglin et al. ................ | 707/616 |
| 8,417,938 | B1 * | 4/2013 | Considine et al. ........... | 713/151 |
| 8,504,515 | B2 * | 8/2013 | Prahlad ............. | G06F 17/30156 707/609 |
| 8,661,062 | B1 * | 2/2014 | Jamail ................... | G06F 21/554 707/802 |
| 8,738,906 | B1 * | 5/2014 | Sampath et al. ............. | 713/166 |
| 8,775,556 | B1 * | 7/2014 | Matthews .......... | G06Q 30/0201 709/217 |
| 8,799,467 | B2 * | 8/2014 | Shah et al. ..................... | 709/225 |
| 8,838,691 | B2 * | 9/2014 | Liu et al. ...................... | 709/204 |

(Continued)

OTHER PUBLICATIONS

Kannan et al., "Scissors: Dealing with Header Redundancies in Data Centers through SDN", 2012.*

(Continued)

*Primary Examiner* — O. C. Vostal
(74) *Attorney, Agent, or Firm* — Patent Capital Group (57) ABSTRACT

A method is provided in one example and includes receiving flow data associated with a traffic flow. The flow data can be tagged with a data source identifier identifying a data source exporting the flow data, a source site identifier identifying a site associated with a source device of the traffic flow, and a destination site identifier identifying a destination site associated with a destination device of the traffic flow. The method further includes determining at least one authoritative data source for each site and metric type using at least one selection rule. The method further includes receiving a query for de-duplicated flow data, and generating de-duplicated flow data based on the data source identifier, source site identifier, and destination site identifier and particular flow data associated with the determined at least one authoritative data source.

30 Claims, 6 Drawing Sheets

(56) References Cited

U.S. PATENT DOCUMENTS

| | | | | |
|---|---|---|---|---|
| 2002/0161917 | A1* | 10/2002 | Shapiro | H04L 45/122 709/238 |
| 2003/0069071 | A1* | 4/2003 | Britt | G07F 17/32 463/42 |
| 2003/0110485 | A1* | 6/2003 | Lu et al. | 725/9 |
| 2005/0025123 | A1* | 2/2005 | Mitsumori | H04L 12/2602 370/352 |
| 2008/0098420 | A1* | 4/2008 | Khivesara | G06Q 30/02 725/32 |
| 2008/0168082 | A1* | 7/2008 | Jin et al. | 707/102 |
| 2008/0189408 | A1* | 8/2008 | Cancel et al. | 709/224 |
| 2009/0119275 | A1* | 5/2009 | Chen | G06Q 30/02 |
| 2009/0249458 | A1* | 10/2009 | Banga | G06F 21/31 726/7 |
| 2009/0281861 | A1* | 11/2009 | Miller et al. | 705/8 |
| 2010/0046393 | A1* | 2/2010 | Knapp et al. | 370/253 |
| 2010/0070448 | A1* | 3/2010 | Omoigui | 706/47 |
| 2010/0094710 | A1* | 4/2010 | Ramakrishna | G06Q 30/02 705/14.64 |
| 2010/0125491 | A1* | 5/2010 | Elliott | G06Q 30/02 705/14.4 |
| 2010/0146042 | A1* | 6/2010 | Kruhoeffer | G06Q 30/02 709/203 |
| 2010/0165859 | A1* | 7/2010 | Carruzzo | H04L 43/026 370/252 |
| 2010/0179940 | A1* | 7/2010 | Gilder et al. | 707/622 |
| 2010/0333116 | A1* | 12/2010 | Prahlad et al. | 719/328 |
| 2011/0022718 | A1* | 1/2011 | Evans | G06F 3/0608 709/231 |
| 2011/0060759 | A1* | 3/2011 | Fienblit | G06F 17/30575 707/770 |
| 2011/0145639 | A1* | 6/2011 | Farahmand | H04L 47/125 714/25 |
| 2011/0185016 | A1* | 7/2011 | Kandasamy | G06Q 30/02 709/203 |
| 2011/0196900 | A1* | 8/2011 | Drobychev et al. | 707/812 |
| 2012/0084445 | A1* | 4/2012 | Brock et al. | 709/226 |
| 2012/0166796 | A1* | 6/2012 | Metke | H04L 9/321 713/158 |
| 2012/0210423 | A1* | 8/2012 | Friedrichs | H04L 63/1416 726/22 |
| 2012/0257627 | A1* | 10/2012 | Nguyen et al. | 370/392 |
| 2012/0281708 | A1* | 11/2012 | Chauhan et al. | 370/401 |
| 2012/0303588 | A1* | 11/2012 | Liu | G06F 17/30156 707/674 |
| 2012/0324101 | A1* | 12/2012 | Pecjack et al. | 709/224 |
| 2013/0144847 | A1* | 6/2013 | Spurlock | 707/692 |
| 2013/0151482 | A1* | 6/2013 | Tofano | G06F 3/0641 707/692 |
| 2013/0179419 | A1* | 7/2013 | Hsu | G06F 17/30327 707/706 |
| 2013/0283041 | A1* | 10/2013 | Vajirkar | H04L 61/1511 713/156 |
| 2014/0006362 | A1* | 1/2014 | Noronha | G06F 3/0641 707/692 |
| 2014/0006498 | A1* | 1/2014 | Liu | H04L 67/02 709/204 |

OTHER PUBLICATIONS

Sanadhya et al., "Asymmetric Caching: Improved Network Deduplication for Mobile Devices", 2012.*

Chun et al., "PlanetLab: An Overlay Testbed for Broad-Coverage Services", 2003.*

Harmes, "Pro JavaScript Design Patterns", "Chapter 16 the Command Pattern", 2007.*

Martellone et al., "L.U.N.A. Ads—Sustaining Wireless Access for Mobile Users", 2008.*

Lancope, "About Lanscope's NetFlow Deduplication Technology," Oct. 27, 2009, 4 pages; http://www.lancope.com/blog/about-lancopes-netflow-deduplication-technology.

Cisco Systems, Inc., "Cisco Prime Assurance Manager," Data Sheet, © 2012, 7 pages; http://www.cisco.com/en/US/prod/collateral/netmgtsw/ps11709/ps12349/ps12353/data_sheet_c78-695345.html.

Wikipedia, the free encyclopedia, "Netflow," Apr. 19, 2012, 10 pages; http://en.wikipedia.org/wiki/NetFlow.

"NetFlow Helps Keep Tabs on Your Network," Apr. 3, 2012, 3 pages; http://www.datacenterknowledge.com/archives/2012/04/03/netflow-helps-keep-tabs-on-your-network.

Cisco Systems, Inc., "Introduction to Cisco IOS® Flexible NetFlow," White Paper, Sep. 2008, 21 pages http://www.cisco.com/en/US/prod/collateral/iosswrel/ps6537/ps6555/ps6601/ps6965/prod_white_paper0900aecd804be1cc.html.

Cisco Systems, Inc., "Introduction to Cisco IOS® NetFlow," May 2012, 16 pages http://www.cisco.com/en/US/prod/collateral/iosswrel/ps6537/ps6555/ps6601/prod_white_paper0900aecd80406232.html.

SevOne, "Netflow De-duplication Demystified," Jan. 6, 2011 Video, 2 pages; http://www.sevone.com/resources/videos/netflow-de-duplication-demystified.

* cited by examiner

FLOW DE-DUPLICATION FOR NETWORK MONITORING

TECHNICAL FIELD

This disclosure relates in general to the field of communications and, more particularly, to providing flow de-duplication for network monitoring in a network environment.

BACKGROUND

Comprehensive network management and monitoring requires traffic flow data to be collected from multiple sources. This multitude of data sources often contains duplicated and/or overlapped data since each traffic flow may traverse multiple networking devices and monitoring agents. Thus, the same flow may be reported by more than one source. De-duplication is thus a key technology to ensure that network monitoring solutions report correct traffic statistics without counting multiple instances of the same flow.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving flow data associated with a traffic flow. The flow data is tagged with a data source identifier identifying a data source exporting the flow data, a source site identifier identifying a site associated with a source device of the traffic flow, and a destination site identifier identifying a destination site associated with a destination device of the traffic flow. The method further includes determining at least one authoritative data source for each site and metric type using at least one selection rule. The method further includes receiving a query for de-duplicated flow data, and generating de-duplicated flow data based on the data source identifier, source site identifier, and destination site identifier and particular flow data associated with the determined at least one authoritative data source.

In more particular embodiments, determining at least one authoritative data source includes generating a plurality of candidate authoritative data sources and applying the at least one selection rule to generate the at least one authoritative data source. In more detailed embodiments, the at least one selection rule includes a rule in which a candidate authoritative data source that is local to a particular site is chosen as the authoritative data source of the particular site over a candidate authoritative data source that is remote to the particular site. The at least one selection rule includes a rule in which a candidate authoritative data source providing the most accurate data for a given metric is selected. In still more particular embodiments, the at least one selection rule includes a rule in which a candidate authoritative data source that reports the most traffic from and to a site is chosen as the authoritative data source of the particular site. In still more particular embodiments, the at least one selection rule includes a rule including a user designation of one or more data sources as the authoritative data source of a site. In still more particular embodiments, the at least one authoritative data source includes a plurality of authoritative data sources, wherein generating the de-duplicated flow data includes aggregating flow data from the plurality of authoritative data sources.

In still more particular embodiments, flow data are deduplicated at the time of query by matching the data source identifier and site identifier tags in the flow data to authoritative data source identifiers of respective site identifiers to select only flow data from the authoritative data sources of the respective sites. In still more particular embodiments, upon receiving a deduplication query for a particular site and metric type, the method further includes querying an authoritative data source database to find the identifier of the authoritative data source associated with that particular site and metric type and using that authoritative data source identifier as a filter to query a tagged flow data database to select the flow data from that authoritative data source only and exclude the other data sources. In still more particular embodiments, upon receiving a deduplication query for multiple sites, the method further includes performing a SQL INNER JOIN of an authoritative data source database and a tagged flow data database to include only flow data from the authoritative data sources of the respective sites.

Example Embodiments

Figure 1:
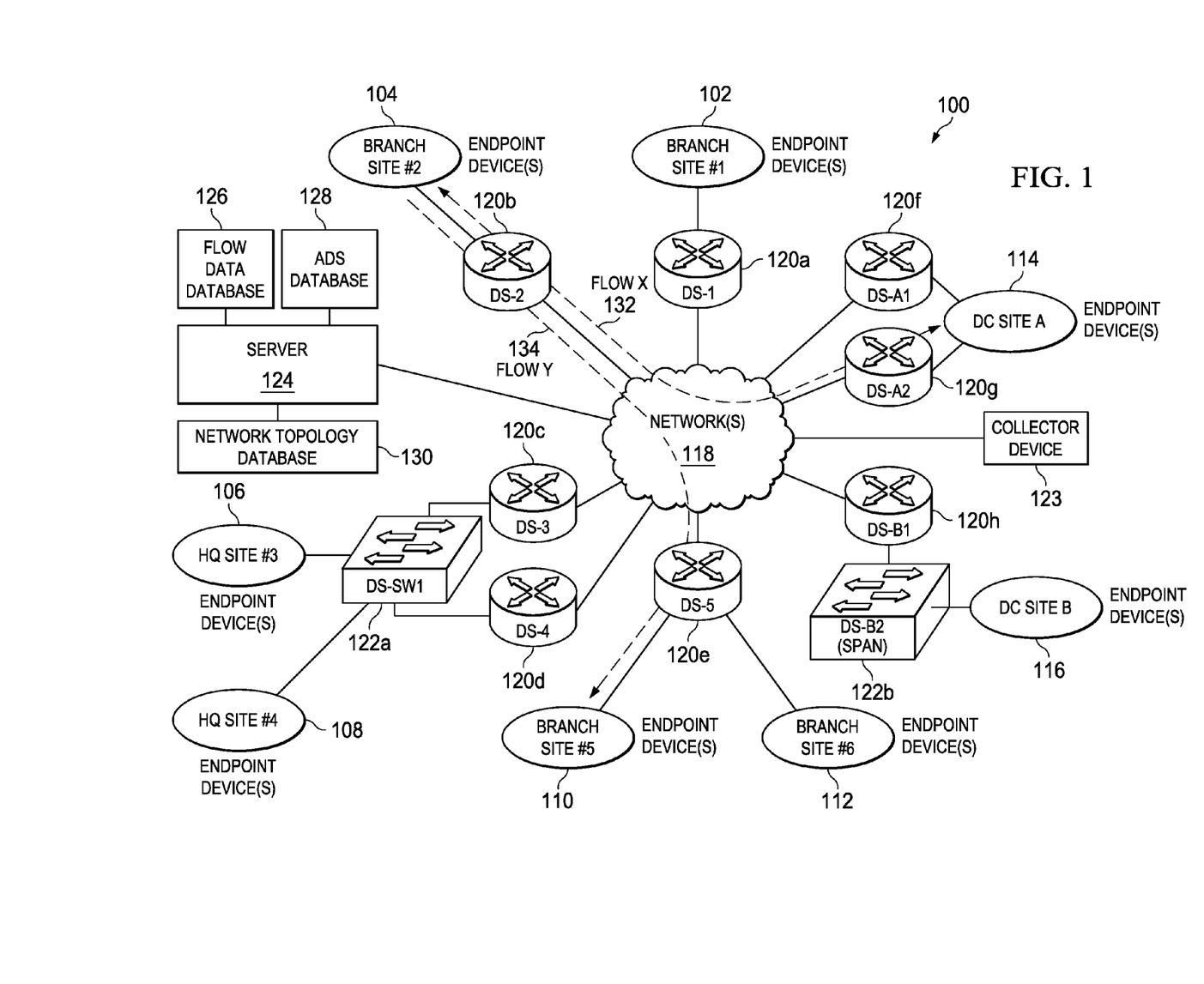
FIG. 1 is a simplified block diagram of an embodiment of a communication system for providing flow de-duplication for network monitoring in a network environment.

Referring now to FIG. 1, FIG. 1 is a simplified block diagram of an embodiment of a communication system 100 for providing flow de-duplication for network monitoring in a network environment in accordance with one embodiment of the present disclosure. FIG. 1 includes a branch site #1 102, a branch site #2 104, a headquarters (HQ) site #3 106, a headquarters (HQ) site #4 108, a branch site #5 110, a branch site #6 112, a datacenter (DC) site A 114, and a datacenter (DC) site B 116. Branch site #1 102 is in communication with network(s) 118 via a router 120a having a data source DS-1 originating therefrom. Branch site #2 104 is in communication with network(s) 118 via a router 120b having a data source DS-2 originating therefrom. HQ site #3 106 and HQ site #4 108 are each in communication with network(s) 118 via both router 120c and router 120d through a switch 122a. Switch 122a has a data source DS-SW1 originating therefrom, router 120c has a data source DS-3 originating therefrom, and router 120*d* has a data source DS-4 originating therefrom. Branch site #5 110 is in communication with network(s) 118 via a router 120*e* having a data source DS-5 originating therefrom. Branch site #6 112 is also in communication with network(s) 118 via router 120*e*. DC site A 114 is in communication with network(s) 118 via router 120*f* having a data source DS-A1 originating therefrom and router 120*h* having a data source DS-A2 originating therefrom. DC site B 116 is in communication with a switch 112*b* having a data source DS-B2 originating therefrom. Switch 112*b* is in further communication with a router 120*h* having a data source DS-B1 originating therefrom. Router 120*h* is in further communication with network(s) 118.

Each of branch site number #1 102, branch site #2 104, HQ site #3 106, HQ site #4 108, branch site #5 110, branch site #6 112, DC site A 114, and DC site B 116 include one or more endpoint devices coupled to one or more subnets associated with the respective sites. A particular endpoint device is operable to communicate with one or more other endpoint devices within its own site or another site within the communication system 100. A particular communication between two or more endpoint devices is designated as a network flow. Network flows may be defined in many ways. Endpoint devices can be associated with clients, customers, or end users wishing to initiate a communication in communication system 100 via some network. The term 'endpoint device' is inclusive of devices used to initiate a communication, such as a receiver, a computer, a set-top box, an IRD, or any other device, component, element, or object capable of initiating voice, audio, video, media, or data exchanges within communication system 100. An endpoint device may also be inclusive of devices used to respond to a communication, such as a web server or database server. An endpoint device may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

In a particular embodiment, a network flow is defined according the NetFlow format. NetFlow is a Cisco technology that has become a standard in which a router or an agent exports traffic statistics of the flow between two endpoints rather than per packet. For example, a flow may be established between a client, such as a laptop, smart phone, tablet, etc. and a server, such as a Web server or an FTP server. In another example, a flow may be established between two Internet Protocol (IP) phones. In some embodiments, a router exports the flow data per flow to a central server, and the central server uses the flow data to report the network traffic statistics. For example, the central server may determine that in the last minute for a particular site the number of bytes sent and received, the number of packets received, or similar metrics. In addition, the router can send other metrics such as a summary of the voice quality for the flow during the last minute. In NetFlow, a flow may be defined as a unidirectional sequence of packets that share the following values: Ingress interface; Source IP address; Destination IP address; IP protocol; Source port for UDP or TCP, 0 for other protocols; Destination port for UDP or TCP, type and code for ICMP, or 0 for other protocols; and IP Type of Service. The same or similar definitions may be used to designate flows in other protocols such as IPv6, MPLS, and Ethernet. In still other embodiments, other suitable methods of defining a flow may be used.

Communication system 100 further includes a collector device 123 in communication with network(s) 118. Collector 123 is a device that gathers network traffic flow data from exporting devices, such as one or more of routers 120*a*-120*h* or switches 122*a*-122*b*, within network(s) 118. In a particular embodiment, Netflow data from an exporting device (e.g. a router or switch) contains the IP addresses of the flow's source, destination, and exporting devices. Although the particular embodiment illustrated in FIG. 1 includes collector device 123, it should be understood that in other embodiments more than one collector device may be used. Communication system 100 further includes a server 124 in communication with network(s) 118. Server 124 is further in communication with a flow data database 126, an authoritative data source (ADS) database 128, and a network topology database 130 whose respective operations will be further described herein. In at least one embodiment, collector device 123 may be configured to collect flow data from one or more routers or switches, tag the flow data with a site identifier (ID) associated with the flow's source device, a site ID associated with the flow's destination device, and a data source ID. Collector device 123 may be further configured to export the tagged flow data to server 124 as further described herein. In various embodiments, the server 124 is configured to receive the tagged flow data, determine one or more authoritative data sources associated with each site, and de-duplicate the flow data in response to a query as further described herein.

In the particular embodiment illustrated in FIG. 1, a Flow X 132 is established between an endpoint device at Branch Site #2 104 and an endpoint device at DC Site A 114. Flow X 132 passes through router 120*b* at Branch Site #2 104, network(s) 118, and router 120*g* at DC Site A 114. A Flow Y 134 is established between an endpoint device at Branch Site #2 104 and an endpoint device at Branch Site #5 110. Flow Y 134 passes through router 120*b* at Branch Site #2 104, network(s) 118, and router 120*e* at Branch Site #5. In this case it can be seen that there is traffic flow going through three routers: router 120*b* at Branch Site #2 104, router 120*g* at DC site A 114, and router 120*e* at Branch Site #5 110. Accordingly, each of these three routers can export the flows to collector device 123. Collector device 123 can tag each flow with extra data including a site identifier (ID) associated with the flow's source device, a site ID associated with the flow's destination device, and a data source ID associated with the exporting router. Collector device 123 then forwards the tagged flow data to server 124. For example, data source DS-2 from router 120*b* at Branch Site #2 104 reports Flow X 132 and Flow Y 134. Data source DS-5 from Router 120*e* at Branch Site #5 110 can report the data for Flow Y, and data source DS-A2 from router 120*g* can report the data for Flow X 132. As a result, each flow can be reported twice, once by each data source, to collector 123. Collector 123 then tags the data and sends the tagged flow data to server 124. When the tagged flow data is received by server 124, server 124 determines an authoritative data source (ADS) for each site and performs a de-duplication of the flow data at a time of query so that the flow data is no longer duplicated as will be further described herein.

Network(s) 118 represent a series of points or nodes of interconnected communication paths for receiving and transmitting packets of information that propagate through communication system 100. Network(s) 118 offer a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Network(s) 118 may implement a UDP/IP connection and use a TCP/IP communication language protocol in particular embodiments of the present disclosure. However, network(s) 118 may alternatively implement any other suitable communication protocol for transmitting and receiving data packets within communication system 10.

In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

Comprehensive network management requires monitoring of traffic flow data that is collected from multiple sources such as NetFlow exporting routers, Switched Port Analyzer (SPAN), access lists (VACL) sources, passive and active agents such as Wide Area Application Services (WAAS) FlowAgents (FAs) or Integrated Service Router (ISR) Performance Agents (PAs). This multitude of data sources often contain duplicated and/or overlapped data since each traffic flow may traverse multiple networking devices and monitoring agents. When traffic flow data are aggregated and reported, the results may be incorrect due counting of the same flow from more than one source.

De-duplication is thus a key technology to ensure that network monitoring solutions report correct traffic statistics without counting multiple instances of the same flow. One possible objective of de-duplication is to detect, eliminate, and/or compensate data duplications to provide network statistics that are as accurate as possible. However, duplication of monitoring traffic sources may be intentional and not necessarily a result of a misconfiguration of network devices. In some instances, network operators/engineers may want to monitor the same traffic flows from multiple points of the network for troubleshooting purposes. Thus, a possible second objective of de-duplication is that it categorizes and preserves duplicated/overlapped data so that they can be used for point troubleshooting when needed.

A number of existing de-duplication methods have been employed in the industry to try to provide for de-duplication of flow data within networks. On existing method is that of packet de-duplication. In packet de-duplication, duplicated packets are detected using an IP Identification field and discarded. Packet de-duplication is a low-level de-duplication method, not a system-level de-duplication method. Since the duplicate data is thrown away at the collector, the duplicate data is lost and no longer available for any other purpose.

Another existing method for de-duplication is the NetFlow 7-tuple method of flow de-duplication, which uses brute-force detection, and elimination of duplicated raw flow records by matching a flows' 7-tuple keys. The key can be used to identify the particular flow. NetFlow records with the same key (tuples) are detected and discarded by a NetFlow collector, which may be, for example, a NetFlow enabled router. The key is usually the IP address of the endpoints, such as the IP address of a client and an IP address of a server, plus a port number and an application ID for the flow. The NetFlow collector exports a NetFlow record to a central server. When the central server receives the NetFlow record it will try to match the key of the flow and determine that if the key matches a key of a flow over the same timeframe it concludes that this is duplicate flow data. The central server than keeps one NetFlow record and throws away the other NetFlow records to insure there is no duplicate data. For example, if the central server sees two routers reporting a flow with the same client IP address, server IP address, same client port, same server port, etc. over the same time period it concludes that this is duplicate data and can throw one of them away. A problem with this method is that it requires a large number of lookups because a large number of flows may be present in a system. For example, a million or more flows per second could exist in a network. Such brute force de-duplication is very computationally expensive. Accordingly, the NetFlow 7-tuple method works well for small networks, such as those using a single flow collector, but is prohibitively expensive for large/multi-collector deployment as it does not scale in large systems where flow collectors are distributed. It is impractical and almost impossible to do this type of brute force computation on different collectors located at different locations. Another problem with the NetFlow 7-tuple method is that the duplicate data is thrown away and lost so that it is unavailable for use in troubleshooting.

Another existing method for de-duplication is that of one-direction NetFlow export. Many NetFlow applications do not provide de-duplication per se and require users to configure NetFlow to avoid duplication in the first place. In a common practice, IT administrators configure NetFlow on edge routers only and in one direction only (ingress or egress). For example, if there are two routers, one in a branch office and one in a data center, each router is configured to only export traffic in one direction. As a result, when flow data from the routers is combined double counting avoided as only one direction is exported for each router. Thus, the one-direction NetFlow export method is more of a duplication avoidance strategy rather than a de-duplication procedure. The one-direction NetFlow export method eliminates duplication in traffic accounting but reduces visibility, especially in spot troubleshooting where no or only partial data is available for a given spot. Full visibility for each router is not available with one-direction NetFlow export.

Still another existing method for de-duplication is that of most-traffic-source per host. In the most-traffic-source per host method, for each host (network endpoint), the system determines a data source that reports the most traffic to/from that host. The most-traffic-source per host method requires expensive computations when there are large numbers of hosts, and it does not work well in dual-home/asymmetric/performance routing environments in which there is more than one router for a given site. In this case if one router is selected the most-traffic-source per host method won't work because an incomplete picture of the data is presented.

In accordance with one example implementation, communication system 100 can resolve the aforementioned issues associated with deficient flow de-duplicating methods. More specifically, some embodiments of communication system 100 provide a more comprehensive and effective de-duplication than existing methods by analyzing and utilizing not only information from the packet flows but also traffic metadata such as site groups, device inventory, and network topology to determine an authoritative data source for a particular flow.

Various embodiments can provide a de-duplication process that includes three main stages. In a first stage, one or more collectors receive incoming traffic flow data from exporting devices. In the example in FIG. 1, exporting devices include router 120a, router 120b, router 120c, router 120d, router 120e, router 120f, router 120g, and router 120h. In at least one embodiment, the traffic flow data includes an IP address of the flow's source, an IP address of the flow's destination, and IP address of one or more exporting devices. Collector device 123 then analyzes and categorizes the flow data, and tags the flow data with additional information, which can be used in subsequent stages for determining an authoritative data source as well as for performing de-duplication. In a particular embodiment, each flow is tagged with the following classifications: a data source identifier (ID), a site ID of the flow's source device, and a site ID of the flow's destination device. In various embodiments, collector device 123 may perform some flow aggregation before tagging is done. Collector device 123 then sends the tagged flow data to server 124, which stores the flow data in flow data database 126. Server 124 may further aggregate the tagged flow data. For example, in various embodiments, server 124 may aggregate per application how much traffic flow has occurred for each application such as web, ftp, and voice applications. In still other embodiments, server 124 can aggregate the flow data per site, for example, by aggregating how much data is going to and from each site. In various embodiments, the tags can be carried over and used in aggregation schemes such that the data is not lumped together but is kept categorized by data source and site IDs. In various embodiments, the source device site ID, the destination device site ID and the data source ID can be used as aggregation keys.

In a second stage, server 124 performs analysis of incoming data sources and their relationships with other components of the system such as site, device grouping, inventory, and topology, to determine the authoritative data sources (ADS) for each given site for each given type of metric. In various embodiments, server 124 uses a set of ADS selection rules to determine the ADS selections for each site. In at least one embodiment, the ADS selection rules may include one or more of locality rules, static rules, dynamic rules, topology rules, aggregations rules, and user-defined rules. Once the ADSs are detected using the ADS selection rules, they are kept in a table in ADS database 128. The table provides mapping from each site and metric type to associated ADS data source(s).

In a third stage, server 124 receives a de-duplication report request from a user. Upon receiving the report request from the user, server 124 utilizes the data source ID and site ID tags associated with flow data stored in the traffic database from the first stage above as well as the ADS table from the second stage above to perform filtering at the time of query to eliminate duplicated flow data by using the flow data from the authoritative data source only and excluding flow data from other (non-authoritative) data sources. The de-duplicated data is then presented to the user in a report.

Compared to existing de-duplication methods, various embodiments described herein may provide one or more of the following advantages. One potential advantage is that it provides a more comprehensive and effective de-duplication process. Data source and site tagging can be done at very high speeds with little overhead, especially when flow data are pre-aggregated before tagging. Automatic ADS selections take into account many types of information to make the best de-duplication decisions. Another potential advantage is that the one or more embodiments can de-duplicate heterogeneous sources including NetFlow as well as other types of data sources such as SPAN, WAAS Flow Agent (FA), and ISR Performance Agent (PA), since de-duplication is performed at query time after data has been normalized. Another potential advantage is that the process is highly scalable. The tagging process can run on distributed collectors, and there is no need to perform flow lookups across exporters or collectors. Still another potential advantage is that there is no loss of the duplicate information as a result of de-duplication. De-duplication is performed on-demand and overlapping or duplicated data are not discarded. Thus, flow information from all sources is preserved for drill-down, troubleshooting, correlations or other desired uses.

Figure 2:
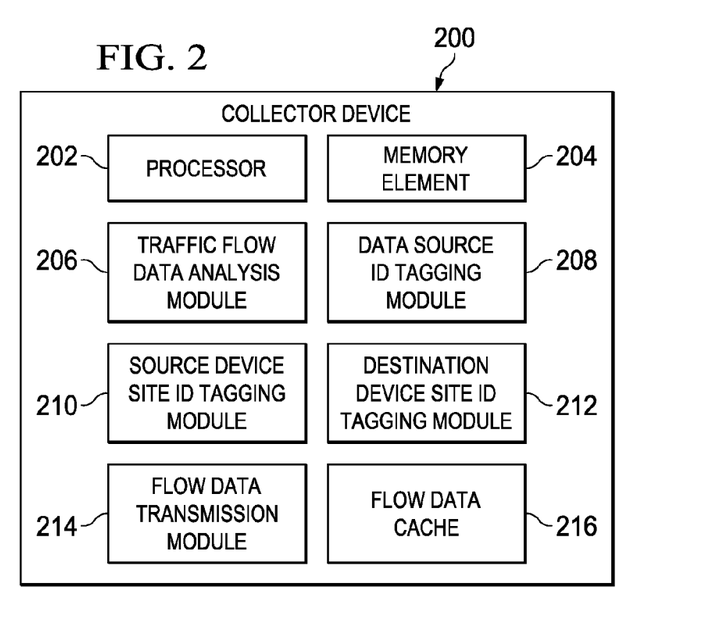
FIG. 2 is a simplified block diagram of an embodiment of a collector device for collecting flow data.

Referring now to FIG. 2, FIG. 2 is a simplified block diagram of an embodiment of a collector device 200 for exporting flow data. In at least one embodiment, collector device 200 is a network device used to gather flow data from one or more exporting devices. In at least one embodiment, collector device 200 is collector device 123 of FIG. 1. In still other embodiments, collector device 200 may be combined with server 124 or an exporting device or a source device such as being included in one or more routers or switches such as router 120a, router 120b, router 120c, router 120d, router 120e, router 120f, router 120g, router 120h, switch 122a, and switch 122b. Collector device 200 includes a processor 202, a memory element 204, traffic flow data analysis module 206, a data source ID tagging module 208, a source device site ID tagging module 210, a destination device site ID tagging module 212, a flow data transmission module 214, and a flow data cache 216. Processor 202 is configured to execute operations to perform the various functions of collector device 200. Memory element 204 is configured to store data associated with the operation of processor 202. Traffic flow data analysis module 206 is configured to receive traffic flow data from one or more exporting devices and analyze the traffic flow data. Data source ID tagging module 208 is configured to tag a data source ID to the flow data. Source device site ID tagging module 210 is configured to tag a source device site ID to the flow data. Destination device site ID tagging module 212 is configured to tag a destination device site ID to the flow data. The flow data transmission module 214 is configured to transmit the tagged flow data to server 124. Flow data cache 216 is configured to store flow data prior to tagging and transmission of the flow data to server 124. The various operations of collector device 200 will be further described in more detail herein.

Figure 3:
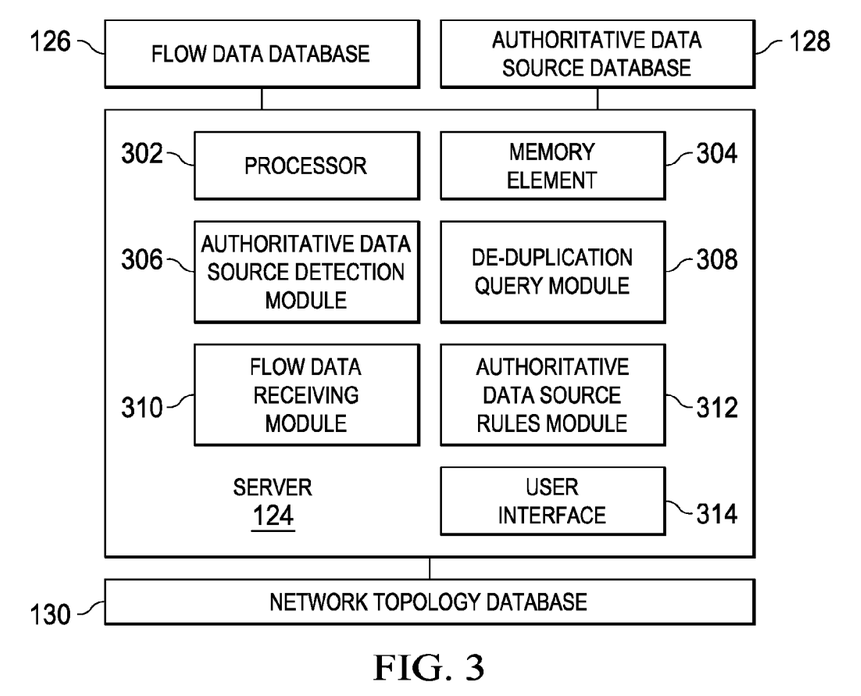
FIG. 3 is simplified block diagram illustrating an embodiment of a server for determining authoritative data sources and de-duplicating flow data.

Referring now to FIG. 3, FIG. 3 is simplified block diagram illustrating an embodiment of server 124 for determining one or more authoritative data sources and de-duplicating flow data. Server 124 includes a processor 302, a memory element 304, an ADS detection module 306, a de-duplication query module 308, a flow data receiving module 310, an ADS rules module 312, and a user interface 314. Processor 302 is configured to execute operations to perform the various functions of server 124. Memory element 304 is configured to store data associated with the operation of processor 302. ADS detection module 306 is configured to determine one or more ADSs associated with a site and/or metric as further described herein. De-duplication query module 308 is configured to query one or more of flow data database 126, ADS database 128, and network topology database 132, and generate a de-duplication flow data report based on a user request. Flow data receiving module 310 is configured to receive tagged flow data from one or more collector devices 123. The ADS rules module 312 is configured to store one or more rules used by the ADS detection module 306 to determine the ADS for a site and/or metric. User interface 314 is configured to provide an interface to a user to request a de-duplication report and display the de-duplication report to the user. In still other embodiments, user interface 314 may be further configured to allow a user to configure various aspects of server 124 such as allowing a manual designation of an ADS for particular site and/or metric. In at least one embodiment, user interface 314 includes a graphical user interface (GUI).

Figure 4:
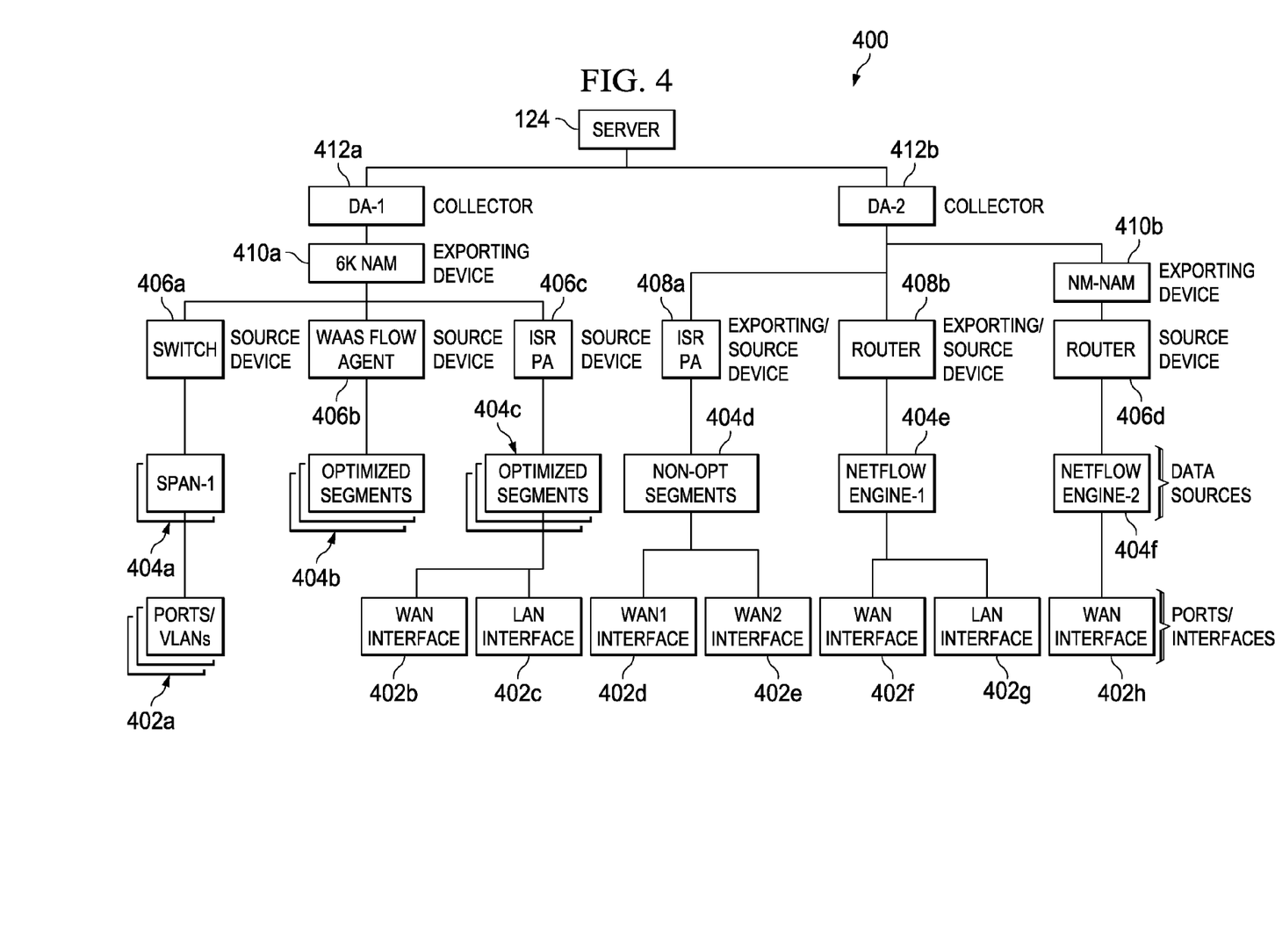
FIG. 4 is a simplified block diagram illustrating a hierarchical arrangement of data sources and devices in an embodiment of a communication system for providing flow de-duplication.

Referring now to FIG. 4, FIG. 4 is a simplified block diagram illustrating a hierarchical arrangement of data sources and devices in an embodiment of a communication system 400 for providing flow de-duplication. The communication system 400 is shown as a conceptual hierarchy illustrating the relationships of various network elements. Ports/interfaces/VLANs 402a-402h carrying traffic flows generated by endpoint devices are monitored by data sources 404a-404f. Data sources 404a-404f belong to either source devices 406a-406c or exporting/source devices 408a-408b. Source devices 406a-406d send the data to exporting devices 410a-410b. Exporting devices 410a-410b and exporting/source devices 408a-408b export flow data to collectors 412a-412b. In the embodiment illustrated in FIG. 4, the role of collecting and tagging of flow data is performed by collectors 412a-412b. Collectors 412a-412b then export the tagged flow data to server 124.

In the particular embodiment illustrated in FIG. 4, ports/interfaces 402a are switch ports/VLANs, ports/interfaces 402b, 402d, 402e, 402f, and 402h are WAN interfaces, and ports/interfaces 402c and 402g are LAN interfaces. Ports/VLANs 402a are monitored by data source (SPAN-1) 404a which belong to source device 406a which is a switch. Source device 406a is further connected to exporting device 410a. In the illustrated embodiment, exporting device 410a is a Cisco Catalyst 6K Network Analysis Module (NAM). Data source 404b includes a number of optimized segments and belongs to source device 406b which is a WAAS FlowAgent. Source device 406b is further connected to exporting device 410a. Port/interface 402b, which is a WAN interface, and port/interface 402c, which is a LAN interface, are monitored by data source 404c which includes a number of optimized segments. The data source 404c belongs to source device 406c which is an ISR PA. Source device 406c is further connected to exporting device 410a. Exporting device for 410a is still further connected to collector DA-1 412a. Collector DA-1 412a is further connected to server 124.

Port/interface 402d, which is a first WAN interface (WAN1), and port/interface 402e, which is a second WAN interface (WAN2), are monitored by data source 404c which includes non-optimized segments. Data source 404d belongs to exporting/source device 408a which is an ISR PA configured as both a source device and an exporting device. Exporting/source device 408a is further connected to collector DA-2 412b. Port/interface 402f, which is a WAN interface, and port/interface 402g, which is a LAN interface, are coupled to data source 404e which is a first NetFlow engine (NetFlow Engine-1). Data source 404e belongs to exporting/source device 408b which is a router enabled as both an exporting and source device. Exporting/source device 408d is further connected to collector DA-2 412b. Port/interface 402h, which is a WAN interface, is monitored by data source 404f which is a second Netflow engine (NetFlow Engine-2). Data source 404f belongs to source device 406d, which is a router configured as a source device. Source device 406d is further connected to exporting device 410b which is a Network Analysis Module (NM-NAM). Exporting device 410b is further connected to collector DA-2 412b. Collector DA-2 412b is further connected to server 124. In a particular embodiment, server 124 is configured with Cisco Prime Infrastructure software.

During an example operation of communication system 400, the exporting devices 410a-410b and exporting/source devices 408a-408b receive flow data from data sources 404a-404f and export the flow data to the respective collector DA-1 412a and collector DA-2 412b to which they are connected. Collector DA-1 412a and collector DA-2 412b tag their respective flows with a data source identifier (ID), a site ID of the flow's source device, and a site ID of the flow's destination device. The exporter device then sends the tagged flow data to server 124. Server 124 then performs the ADS selection and de-duplication operations as further described herein. Accordingly, in various embodiments, there can be multiple levels of collection, and the flow data is aggregated and exported to server 124 where de-duplication is performed. It should be understood that FIG. 4 is intended to illustrate just one particular embodiment of a de-duplication system and that many other arrangements are possible within the scope of the present description.

Figure 5:
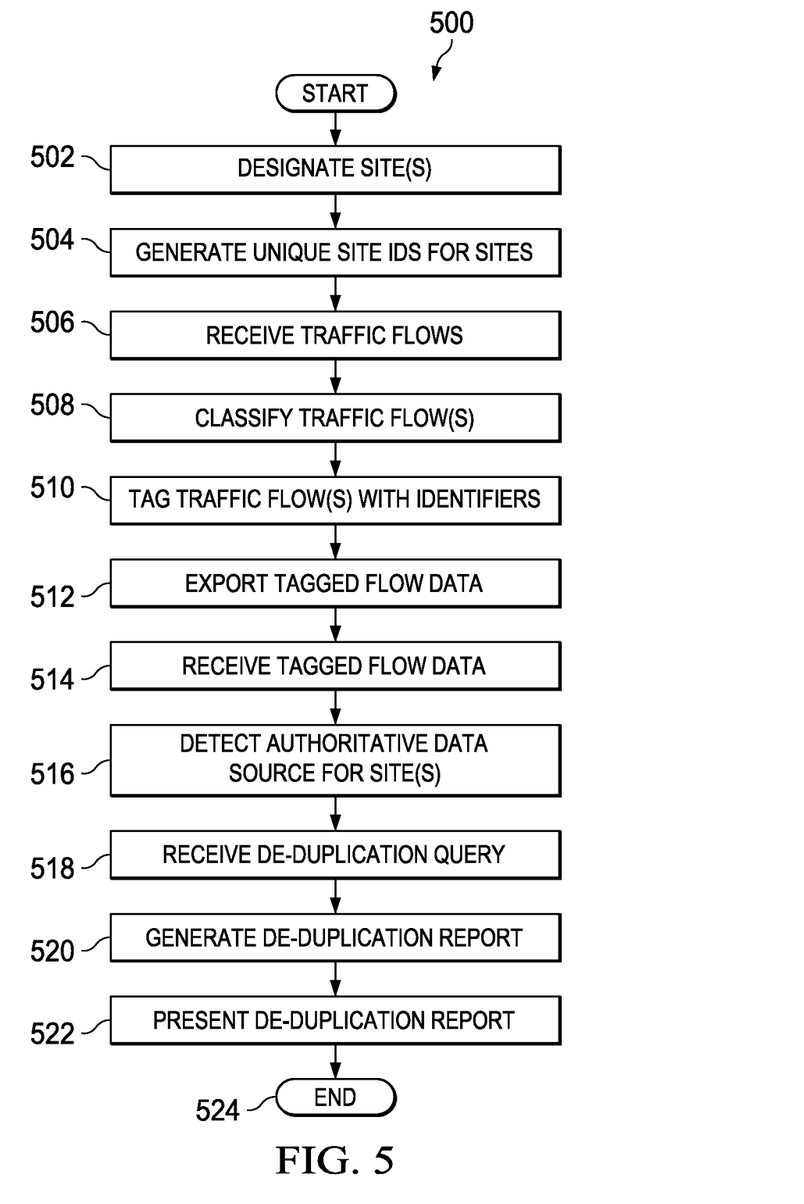
FIG. 5 is a simplified flowchart illustrating potential operations for flow de-duplication associated with the present disclosure.

Referring now to FIG. 5, FIG. 5 is a simplified flowchart 500 illustrating a potential process for flow de-duplication associated with the present disclosure. In 502, one or more site(s) is designated. In a particular embodiment, the sites may be designated by a user. A site is defined as a set of endpoint devices (or hosts) that are grouped together by a common location within communication network 100. For example, a site may include endpoint devices from the same subnet(s), branch router interface(s), or VLAN(s). In various embodiments, a site is further associated with a geographic location. For example, a branch of communication network 100 that is located in New York may be designated as a site. Referring back to FIG. 1, branch site #1 102, branch site #2 104, HQ site #3 106, HQ site #4 108, branch site #5 110, branch site #6 112, DC site A 114, and DC site B 116 are each designated as a separate site within communication network 100.

It should be noted that in this description, "sites" are not simply groups of data sources. In the context for flow de-duplication according to various embodiments, "sites" are groups of "end-point" devices or hosts (PCs, phones, servers, etc.) from/to which traffic flows originate/terminate. As discussed, these endpoint sites are often defined using subnets. The relationship between "sites" and data sources is not a simple 1-N grouping. Instead, they are orthogonal and have multiple many-many (N-M) relationships. For example, a "Monitored By" relationship exists in which a site could be monitored by many data sources, and many sites could be monitored by one data source. For example, traffic from a site could traverse multiple routers and thus be monitored by multiple NetFlow data sources. Inversely, one router could monitor traffic from many sites passing through it.

In 504, unique site IDs are generated for each of the designated sites. The site ID is a system-wide unique ID that identifies the site from which a flow either originates or is destined. In various embodiments, the site ID is a system generated number. In at least one embodiment, a user defines a site, gives the site a site name, and defines subnets that are part of that site and/or what devices are associated with that site. For example, a user may define branch site #1 102 as being the New York branch and specify that the New York branch includes all of the laptops belonging to subnet 1.2.3.0/24. In addition, a site may also be associated with one or more individual IP addresses. In a particular instance, the subnet can be used when the user wants to define the endpoint devices of the site, since there may be a large number of endpoint devices. However, for a switch and router, for example, a user may use an individual IP address to define the switching or routing device of a site. In at least one embodiment, once the user groups the individual endpoints or network elements into a site, the system, such as server 124, automatically generates a unique site ID for that site and the site ID is tagged into the flow data to and from that site. Thus, in various embodiments, each flow can have a source ID and a destination ID tagged into it. In a particular embodiment, server 124 is configured to generate the site IDs and map a particular ID onto a subnet. In some embodiments, user interface 314 of server 124 is provided to allow a user to specify which subnets are associated with a particular site.

In 506, collector device 123 receives information about traffic flow(s) from exporting devices associated with one or more sites, such as from one or more of the routers of FIG. 1. In a particular embodiment, the traffic flow information from the exporting device includes IP addresses associated with a flow's source, destination, and exporting devices. In 508, collector device 123 classifies the traffic flows. Each data source is associated with a source device and an exporting device. The source device is the device from which the traffic flows are originally probed. As discussed, the exporting device is the device that transmits traffic flow data to collector device 123. In many cases, e.g. with a NetFlow router, the source device is also the exporting device. However, in other cases the source device and the exporting device could be different such as a case in which a NAM may be an exporting device for a WAAS FlowAgent source device. For each flow, collector device 123 classifies from which data source the flow originated and the sites associated with the flow. Each flow is usually associated with two sites, the source site, and the destination site for that flow. The data source ID identifies the source from where the flow is monitored. This could be, for example, a router, a switch, or a Netflow engine that is monitoring traffic data, or an agent, such as a monitoring agent (e.g., a NAM) or a flow agent that is monitoring traffic data. A router, switch, or agent may have more than one data source. For example, before-optimization and after-optimization traffic flows from the same router are classified as different data sources. Each of these data sources can be uniquely identified by a data source ID.

In 510, collector device 123 tags the traffic flow(s) with identifiers associated with the data source, the site associated with the flow's source device, and the site associated with the flow's destination device. Accordingly, after classification each flow can be tagged with the data source ID and two site IDs associate with that flow, the source site ID for the flow and the destination site ID for that flow. For example, if the traffic associated with the flow is coming from a particular branch, a source site ID associated with that branch can be used to tag the data. The unique data source ID is associated with a source device sending the traffic data. The source device is usually a switch or a router that is monitoring the traffic or it could be a probe on an agent that is monitoring the network. In at least one embodiment, the data source ID is generated by the system automatically and not by the user. In a particular embodiment, server 124 is aware of when it receives data from particular data sources and automatically assigns an ID for that data source.

In 512, the tagged flow data is exported by collector device 123 to server 124. In a least one embodiment, collector device 123 can output a flow record when it determines that the flow is finished. In a particular embodiment, collector device 123 does this by flow aging in which when collector device 123 sees new traffic for an existing flow it resets an aging counter. In another embodiment, TCP session termination in a TCP flow may cause collector device 123 to expire the flow and export the tagged flow data. In still other embodiments, collector device 123 may be configured to output a flow record at a fixed interval even if the flow is still ongoing. In still other embodiments, collector device 123 may aggregate flow records before exporting them.

In 514, the tagged flow data is received by server 124 from collector device 123. In 516, server 124 detects one or more authoritative data sources for each site. In one or more embodiments server 124 performs analysis of incoming tagged data sources and their relationships with other components of communication system 100 such as site definition, device grouping, device inventory, and network topology to determine the authoritative data sources (ADS) for each site for a given metric type. Thus, among the multiple data sources that monitor a given site, one or more is selected as the ADS of that site for a given metric type. Inversely, a data source could be the ADS of one or many sites.

In one or more embodiments, server 124 uses a set of authoritative data source (ADS) rules to determine the ADS selections for a given site and given metric. In at least one embodiment, the ADS rules may include one or more of locality rules, static rules, dynamic rules, dual-home/asymmetric routing detection rules, aggregation rules, and user-defined rules.

Locality Rules: The locality rules are based on the assumption that data sources from a local site are more authoritative than from remote sites. For example, traffic flows from a branch office may be reported by the branch's ISR router as well as one or more routers located at a remote data center. If a router is connected (adjacent) to a group of endpoint host devices that constitute a site such as an ISR router connecting personal computers in a branch office, then the data source from that router is considered "local" to that site. In contrast, a router in a data center that monitors traffic originated from a branch site is consider a "remote" data source relative to that branch site. In this case, the ISR data source at the local branch site is more authoritative for reporting the branch traffic because it is the local source.

Using topology, trace route, or other information, server 124 may be aware that endpoint devices in Branch Site #2 104 are adjacent to router 120b, and thus router 120b is the "local" data source for Branch Site #2 104. Router 120g and router 120e on the other hand are remote data sources because they are located at sites remote from Branch Site #2 104. Thus by the locality rule, router 120b is the preferred candidate to be the ADS of Branch Site #2 104. Similarly, router 120g is the "local" data source relative to DC Site A 114 and thus its ADS. In various embodiments, for each data source its local site is the site of the source device, or the site of the exporting device if the site of the source device is unknown.

Locality is determined in one embodiment from using topology information from network topology database 130. Other locality information may include for example information indicating that a particular device belongs to a particular subnet. In at least one embodiment, server 124 looks at a site definition to determine whether a particular router belongs to particular site. In a particular embodiment, server 124 may use a site routing table and data source table to determine the locality of a given data source. In still other embodiments, other suitable methods may be used.

Dynamic Rules: According to the dynamic rules, for a given site and metric type, the data source with the most traffic activities is preferred. In some cases, topology information may not be available and thus server 124 may not be able to determine whether router 120b, router 120e, or router 120g is the local data source for Branch Site #2 104. In this case, a locality rule cannot be used to determine the ADS. Instead, the dynamic rule "most traffic activities" is used. Accordingly, if there is no local data source or if there is more than one local data source then the data source with the most traffic activities for a given site and metric type is chosen as the ADS. Returning to FIG. 1, assume it is desired to determine the ADS for Branch Site #2 104 and it is unknown which data sources are local and which are remote. In this case, server 124 applies the dynamic rule and determines which data source is reporting the most traffic activities for that site and metric type. In this case, router 120b is reporting the traffic for two flows at Branch Site #2 104, Flow X 132 and Flow Y 134. Router 120g is reporting the traffic for only one flow from Branch Site #2 104, Flow X 132. Similarly, router 120e is only reporting the traffic for one flow from Branch Site #2, Flow Y 134. Thus, router 120b can report the most amount of traffic since it is aware of both flows. Applying the dynamic rule, router 120b can be chosen as the preferred ADS to report traffic volume metrics for Branch Site #2 104.

The dynamic rule can also be useful when there are multiple local data sources for a given site in which server 124 should decide which one is the ADS. For example, a site could have a primary router and a backup router. Since both are local data sources, the dynamic rule would pick the active router as the ADS source because it is currently receiving the most traffic. This rule is a "Dynamic" rule because the most-traffic source can change dynamically over time such as in the case of failure or changeover of a router.

Static Rules: In many cases, it is known in advance that for certain metric types some data sources are preferable over other types of data sources because they are known to report better statistics about certain metrics than other types of data sources. For example, NAM data sources report a rich set of Application Response Time (ART) metrics that many NetFlow data sources do not provide. Accordingly, information about the data source types and its capabilities should be taken into account when selecting an ADS. Static rules determine the ADS based on the metric type that a user may wish use to perform de-duplication of the flow data. The static rules are based on the assumption that for particular metric types certain types of data sources are preferred over others. For example, for Application Response Time (ART) metrics, SPAN, PA, or Wide Area Application Engine (WAE) data sources may be preferred. For Media metrics, SPAN or Medianet data source may be preferred. For traffic statistic metrics, NetFlow (NDE) data sources may be preferred. Thus, each site is associated with one or more authoritative data sources and each class of metrics (traffic statistic vs. ART vs. Media) may have a different authoritative source.

Dual-Home/Asymmetric routing detection rules: In certain circumstances a dual-home or asymmetric routing situation could exist. For example a site may be served by two routers for load-balancing or for redundancy between the two routers. In such a situation, in order to capture the whole traffic for the site, multiple ADSs may need to be selected for a given site. For example, at DC Site A 114, flow data from router 120f and router 120g may need to be combined. In this case, server 124 may use topology information to detect this type of situation and more than one ADS may be selected for a given metric for the site by server 124. In a particular embodiment, server 124 may use network topology information obtained from network topology database 130 to determine if more than one ADS is needed for a given site.

Aggregation Rules: When multiple ADS sources are selected, different aggregation functions are used to combine the flow data from the multiple ADSs. The aggregation functions may differ depending upon the metric. Examples of aggregation functions that may be used include AVG, MAX, MIN, and SUM functions as well as any other suitable aggregation function. As discussed, the aggregation rules may be per metric, so that server 124 may have access to a table for use when more than one ADS is selected which maps a particular metric to a particular aggregation rule to be used to combine the data from multiple ADSs. Examples of aggregation functions are shown below in Table 1.

TABLE 1

Metric Aggregation Functions

| Metrics | Aggregation Functions |
|---|---|
| Traffic Statistics | |
| In Bytes | SUM |
| Out Bytes | SUM |
| Total Bytes | SUM |
| In Packets | SUM |
| Out Packets | SUM |
| Total Packets | SUM |
| ART | |
| Average Response Time | Weighted AVG |
| Min Response Time | MIN |
| Max Response Time | MAX |
| Number of Responses | SUM |
| Number of Late Responses | SUM |
| Number of Responses 1 | SUM |
| Number of Responses 2 | SUM |
| Number of Responses 3 | SUM |
| Number of Responses 4 | SUM |
| Number of Responses 5 | SUM |
| Number of Responses 6 | SUM |
| Number of Responses 7 | SUM |
| Client Bytes | SUM |
| Server Bytes | SUM |
| Client Packets | SUM |
| Server Packets | SUM |
| Avg number of concurrent connections | SUM |
| Number of new connections | SUM |
| Number of closed connections | SUM |
| Number of unresponsive connections | SUM |
| Number of refused connections | SUM |
| Average Connection duration | Weighted AVG |
| Average Server Response Time | Weighted AVG |
| Min Server Response Time | MIN |
| Max Server Response Time | MAX |
| Average Network Time | Weighted AVG |
| Min Network Time | MIN |
| Max Network Time | MAX |
| Average Client Network Time | Weighted AVG |
| Min Client Network Time | MIN |
| Max Client Network Time | MAX |
| Average Server Network Time | Weighted AVG |
| Min Server Network Time | MIN |
| Max Server Network Time | MAX |
| Average Total Response Time | Weighted AVG |
| Min Total Response Time | MIN |
| Max Total Response Time | MAX |

TABLE 1-continued

Metric Aggregation Functions

| Metrics | Aggregation Functions |
| --- | --- |
| Average Transaction Time | Weighted AVG |
| Min Transaction Time | MIN |
| Max Transaction Time | MAX |
| Number of Transactions | SUM |
| Average Data Transmission Time | Weighted AVG |
| Average Data Time | Weighted AVG |
| Packets Retransmitted | SUM |
| Bytes Retransmitted | SUM |
| Average Retransmission Time | Weighted AVG |
| Client ACK Round trip Time | Weighted AVG |
| Number of Client ACK Round Trips | SUM |
| Media (Voice) | |
| Average Call Duration | Weighted AVG |
| Average MOS Score | Weighted AVG |
| Worst MOS Score | MAX |
| Actual Packet Loss (%) | Weighted AVG |
| Adjusted Packet Loss (%) | Weighted AVG |
| Jitter | Weighted AVG |
| SOC | |
| SSC | |
| Max Consecutive Pkt Loss | MAX |
| Pkt to Pkt Jitter | Weighted AVG |
| Stream Count | SUM |

User-Designated ADS & Manual Override rules: In various embodiments, the user can review the automatically detected ADS for each site and metric type and make manual adjustments or overrides if needed or desired. For example, a user may override whatever the ADS autodetection algorithms selected as the site and/or metric's ADS if the user knows better than the system which data source should be the ADS. In a particular embodiment, the user may make the manual adjustment/overrides using user interface 314 of server 124. Server 124 can then use the user-specified ADS when performing de-duplication.

The above rules can be combined using different precedence orders to detect the ADS associated with each site and metric type. For example, user-designated ADS rule can take higher precedence than other auto-detected ADS rules. Once the ADSs are detected using the ADS detection rules, the detected ADSs are stored in one or more tables in the ADS database 128. Table(s) within the ADS database 128 provide mapping from each site and metric type to an associated ADS data source(s).

Returning to FIG. 5, in 518, server 124 receives a de-duplication query from a user. In various embodiments, the de-duplication query includes a request for de-duplicated flow data associated with a particular site and for a particular metric. In 520, server 124 generates a de-duplication report in response to the query. Server 124 utilizes the data source ID and site ID tags stored in the flow data database 126 as well as the ADS information from ADS database 128 to perform filtering at the time of query to eliminate duplicated data. Server 124 can query the ADS database to find the identifier(s) of the ADS(es) associated with the particular site and metric type and use that ADS identifier(s) as a filter so that if multiple data sources supply data for that site, server 124 can filter and report the data for that ADS(es) only and exclude the other data sources when it generates the data for the report.

In 522, server 124 presents the de-duplication report to the user. In a particular embodiment, when viewing reports, a user can be presented with the authoritative data source default selection and a list of alternative data sources that may be relevant to the particular reports the user is viewing. The alternative data source list can be generated dynamically by querying the performance database to determine which alternative data sources can provide data for the reports. In still other embodiments, the user can manually override the automatic selection of the authoritative data source. Manual selection of an authoritative data source can be a temporary one-time event or it may permanently reassign an authoritative data source to the site. In still other embodiments, the user can select multiple data sources from the alternative data source list to be combined to generate the reports in order to support complementary sources such as dual-home routers. In still other embodiments, a user can select no data source filter, which means data can be combined from all sources that have data relevant to the report. This may be used to support NetFlow one-direction (ingress/egress) use cases when there is no single "authoritative data source." This can be a one-time or global preference option. In still other embodiments, once a user confirms/selects the authoritative data source(s), SQL queries to the flow data database can use the corresponding data source IDs to filter the data to generate the reports free of duplicated data. In 524, the procedure ends.

Figure 6:
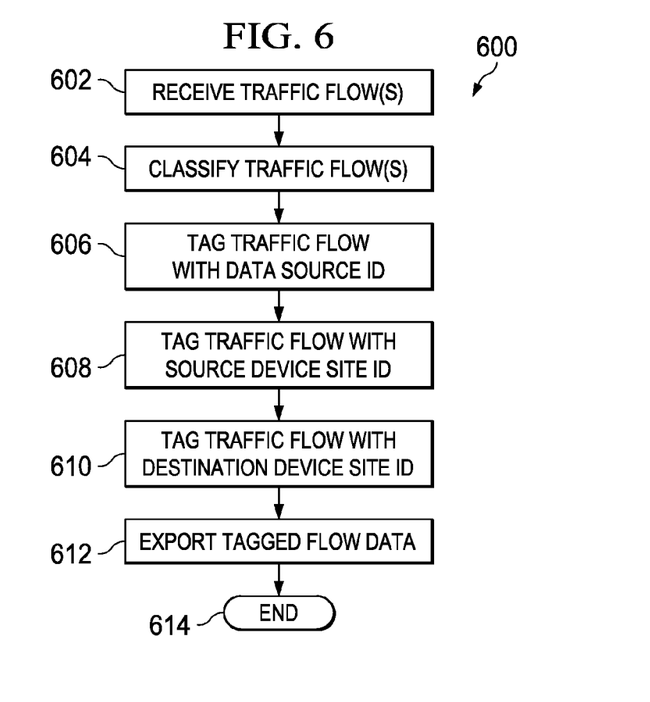
FIG. 6 is a simplified flowchart illustrating potential operations for flow categorization and tagging by a collector device associated with present disclosure.

Referring to FIG. 6, FIG. 6 is a simplified flowchart 600 illustrating potential operations for flow categorization by collector device 123 associated with present disclosure. In 602, collector device 123 receives traffic flow(s) associated with one or more sites from one or more exporting devices such as one or more of the routers or switches of FIG. 1. In 604, collector device 123 classifies the traffic flow(s). For each flow, collector device 123 classifies the data source from which the flow originated, the site associated with the source device of the flow, and the site associated with the destination device of the flow.

In 606, collector device 123 tags the traffic flow(s) with a data source ID. The data source ID uniquely identifies the source from which each flow is monitored. In 608, collector device 123 tags the traffic flow(s) with a source device site ID that uniquely identifies the site associated with the source device of the flow. In 610, collector device 123 tags the traffic flow with a destination device site ID, which uniquely identifies the site, associated with the destination device of the flow. In 612, the tagged flow data including the data source ID, source device site ID, destination device site ID as well as traffic flow statistics associated with the flow is exported by collector device 123 to server 124. In 614, the procedure ends.

Figure 7:
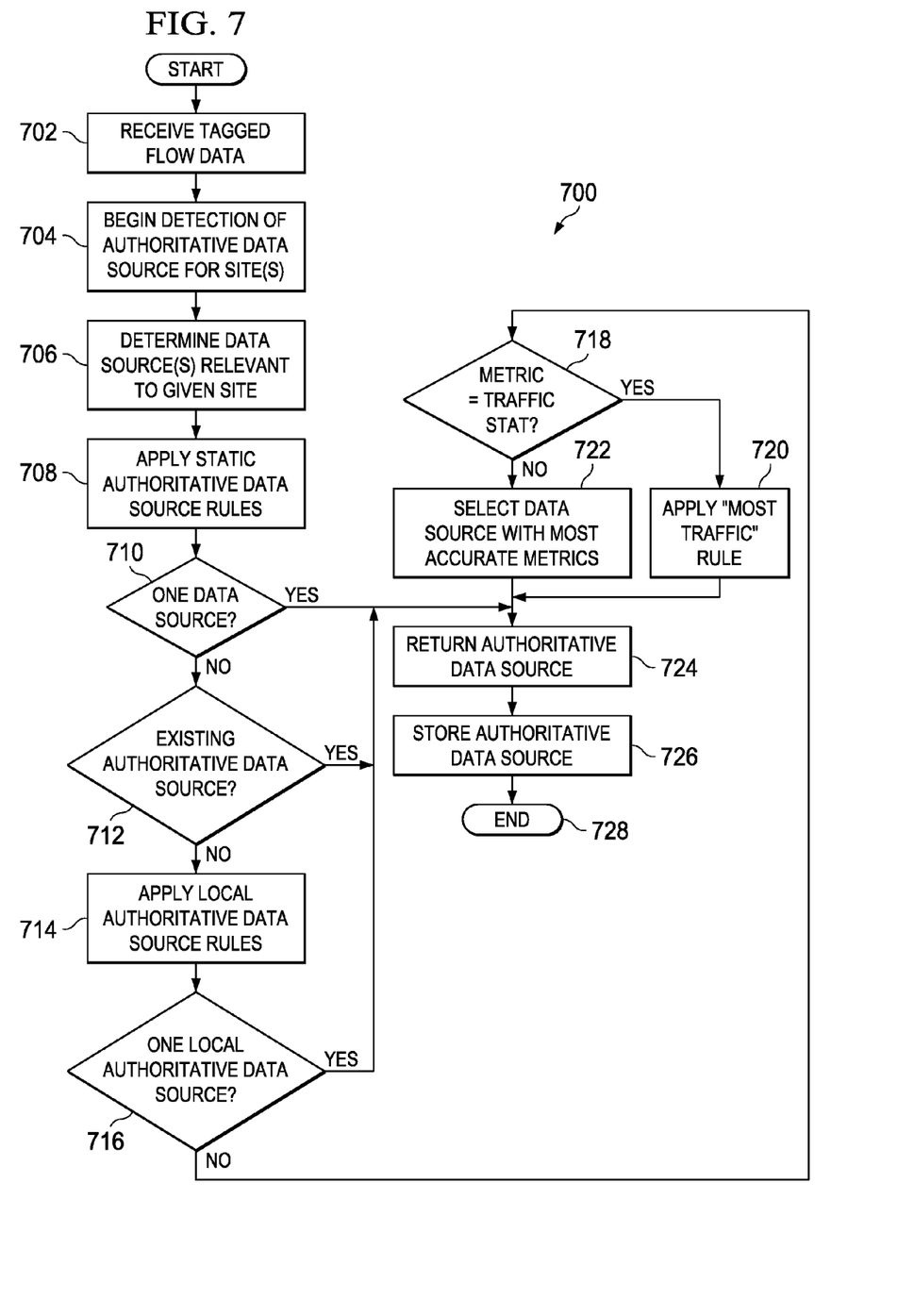
FIG. 7 is a simplified flowchart illustrating potential operations for determining one or more authoritative data sources associated with the present disclosure.

FIG. 7 is a simplified flowchart 700 illustrating potential operations for determining one or more authoritative data sources and de-duplicating flow data associated with the present disclosure. In 702, tagged flow data is received by server 124 from collector device 123. In 704, server 124 begins a procedure for detection of authoritative data sources for each site. In 706, server 124 determines the data source(s) that carry data relevant to a given site. In a particular embodiment, server 124 queries a database to determine which data sources carry data relevant to the given site. This generates a list of candidate authoritative data sources for the site. In 708, server 124 applies static ADS rules to reduce the list of candidate alternative data sources. For example, SPAN may be preferred for ART metrics so in that case, one or more SPAN data sources at the site may be determined to be candidate data sources for the site for an ART metric. In 710, it is determined whether the list of candidate sources has only one data source left. If there is one data source left, the procedure continues to 724 in which the data source is returned as the ADS for the site. If there is more than one data source left, the procedure continues to 712 in which it is determined whether the candidate list contains a source that is already designated as "authoritative" by the user in the site definition. If so, the procedure continues to the aforementioned 724 in which the data source is returned as the ADS for the site.

In 714, local ADS rules are applied to the existing candidate list. In 714, server 124 looks up the source devices (e.g., routers and/or switches) that are associated with each data source. The data sources that belong to a source device local to the site can be preferred over remote sources as the authoritative data source for that site. In 716, it is determined whether there is only one "local" data source found. If there is only one "local" source found, the procedure continues to the aforementioned 724 in which the data source is returned as the ADS for the site. If there are multiple sources left in the candidate list, the procedure continues to 718. In 718, it is determined whether the metric is for a Traffic Stat report. A Traffic Stat report is a report that provides the general traffic volume statistics. If so, the procedure continues to 720. In 720, the "most traffic" rule is applied and the data source with the most traffic is selected. In a particular embodiment, server 124 queries the flow data database to determine the data source with the most traffic. The procedure then continues to the aforementioned 724 in which the data source is returned as the ADS for the site.

If it is determined in 718 that the metric is not a Traffic Stat (such as if the metric is an ART or Media metric), the procedure continues to 722. In 722, the data source with the most accurate metrics is selected. For an ART/WAAS report, for example, the data source with the most accurate metrics or most activities is selected. This may require data to be picked from multiple data sources using multi-segment correlations. The procedure then continues to 724 in which the data source is returned as the ADS for the site. In 726, server 124 stores the authoritative data source for the site in ADS database 128. Steps 704 to 726 can be repeated to find ADS data source(s) for each site and metric type. In 728, the procedure ends.

Figure 8:
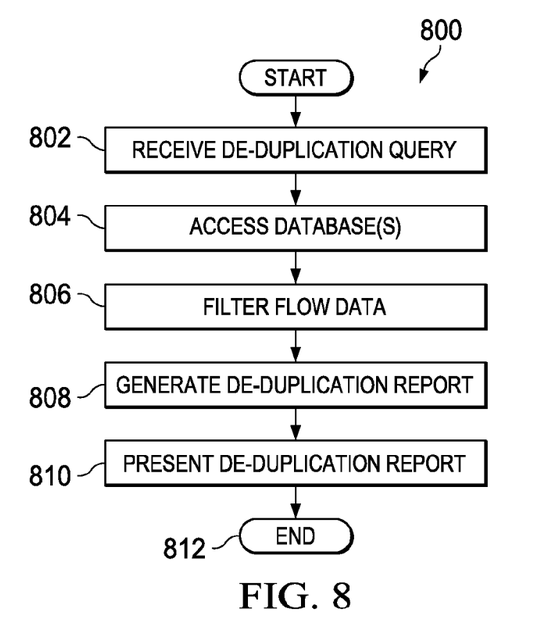
FIG. 8 is a simplified flowchart illustrating potential operations for de-duplicating flow data associated with the present disclosure.

Referring now to FIG. 8, FIG. 8 is a simplified flowchart 800 illustrating potential operations for de-duplicating flow data associated with the present disclosure. In 802, server 124 receives a de-duplication query from a user. In various embodiments, the de-duplication query includes a request for de-duplicated data associated with a particular site or multiple sites and for a particular metric. In 804, server 124 accesses one or more databases including one or more of flow data database 126 and ADS database 128. Server 124 retrieves the data source ID and site ID tags stored in flow data database 126 and ADS information from ADS database 128. In 806, server 124 filters flow data by matching the data source ID and site ID tags stored in the flow data database 126 to the authoritative data source IDs and respective site IDs from ADS database 128 at the time of query to select flow data associated only with the ADS for respective site(s) to eliminate duplicated flow data. In a particular embodiment, server 124 queries the ADS database 128 to find the identifier of the authoritative data source associated with the particular site and metric type and uses that authoritative data source identifier as a filter to query the tagged flow data database 126 so that if multiple data sources supply data for that site and metric type, server 124 can filter and report the data from that ADS only and exclude the other data sources. In another embodiment, server 124 can perform a SQL INNER JOIN of the ADS database and the tagged flow data database to exclude flow data from non-authoritative data sources and include only flow data from authoritative data sources of the respective sites.

In a particular embodiment, a utility function getADS (site, metricType), where the argument site designates the site for which de-duplicated flow data is desired and the metricType argument designates the desired metric type, can be used to determine the ADS(s) of a given site and metric type at query time. This is in turn used for a query filter, e.g. in a WHERE clause in SQL query statement. Each site may have more than one ADS depending on the metric. This necessitates the need for the user to designate the site and the metric. In other embodiments, if the user does not specify one or more of the site and metricType, a default report type may be used. Once the ADS for the selected site is determined, the database is queried and the filter excludes the flow data from the non-authoritative data sources and only uses the data from the ADS(s).

It is fairly straightforward to generate a report for a single site. However, it may be more complex to obtain a report having de-duplication at the enterprise level of multiple sites. For example, if a user requests the Top N Applications in traffic volume of the New York site, a simple filter can be used. In this case, server 124 first calls getADS('NewYork', TRAFFIC_STAT) which returns the authoritative data sources for New York's traffic statistics. Then server 124 uses these authoritative data sources to filter out duplicated traffic from all other sources when querying traffic data for New York. In cases of enterprise-level reports when a user wants summary statistics of all sites rather than a particular sites, server 124 can use an INNER JOIN of flow data database 126 and ADS database 128 to perform de-duplication filtering rather than using the getADS function described above. For example, in a particular embodiment, server 124 may use the following functions:

SELECT host,SUM(inPackets)+SUM(outPackets)

FROM Hosts

INNER JOIN ADS ON Hosts.siteID=ADS.siteID
    AND Hosts.dataSourceID=ADS.dataSourceID
    AND ADS.type=TRAFFIC_STAT GROUP BY host ORDER BY SUM(inPackets)+
    SUM(outPackets)DESC LIMIT 10

In 808, server 124 generates a de-duplication report in response to the query. In 810, server 124 presents the de-duplication report to the user. In 810, the procedure ends.

As used herein in this Specification, the term 'network element' is meant to encompass routers, switches, gateways, bridges, loadbalancers, firewalls, inline service nodes, proxies, servers, processors, modules, or any other suitable device, component, element, proprietary appliance, or object operable to exchange information in a network environment. This network element may include any suitable hardware, software, components, modules, interfaces, or objects that facilitate the operations thereof. This may be inclusive of appropriate algorithms and communication protocols that allow for the effective exchange of data or information. In various embodiments, one or more network elements may perform the functions of collector device 123 and/or server 124 as described herein.

In one example implementation, collector device 123 and/or server 124 may include software in order to achieve the flow de-duplication functions outlined herein. These activities can be facilitated by modules combined in any appropriate manner, which may be based on particular configuration and/or provisioning needs). Collector device 123 and/or server 124 can include memory elements for storing information to be used in achieving the flow data tagging, ADS determination, and de-duplication activities, as discussed herein. Additionally, collector device 123 and/or server 124 may include a processor that can execute software or an algorithm to perform the flow de-duplication operations, as disclosed in this Specification.

Hence, in certain example implementations, the functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory elements can store data used for the operations described herein. This includes the memory elements being able to store software, logic, code, or processor instructions that are executed to carry out the activities described herein.

Moreover, these devices may further keep information in any suitable type of memory element (e.g., random access memory (RAM), read-only memory (ROM), erasable programmable ROM (EPROM), electrically erasable programmable ROM (EEPROM), ASIC, ternary content addressable memory (TCAM), etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements (chip sets, microprocessors, DSPs), modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements.

Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method, comprising:
   receiving, by a server having a processor and memory, flow data associated with a traffic flow, the flow data tagged with a data source identifier identifying a data source exporting the flow data, a source site identifier identifying a source site associated with a source device of the traffic flow wherein the source site identifier identifies a geographical location of the source device, and a destination site identifier identifying a destination site associated with a destination device of the traffic flow wherein the destination site identifier identifies a geographical location of the destination device;
   determining, by the server, at least one authoritative data source for each site and metric type using at least one selection rule;
   receiving, by the server, a query for de-duplicated flow data, wherein the query includes a designation of a particular metric type and a designation of one of a source site identifier associated with a particular source site and a destination site identifier associated with a particular destination site; and
   generating, by the server, de-duplicated flow data based on the particular metric type, data source identifier, source site identifier, destination site identifier and particular flow data associated with the determined at least one authoritative data source.

2. The method of claim 1, wherein determining at least one authoritative data source including generating a plurality of candidate authoritative data sources and applying the at least one selection rule to generate the at least one authoritative data source.

3. The method of claim 2, wherein the at least one selection rule includes a rule in which a candidate authoritative data source that is local to a particular site is chosen as the authoritative data source of the particular site over a candidate authoritative data source that is remote to the particular site.

4. The method of claim 2, wherein the at least one selection rule includes a rule in which a candidate authoritative data source providing the most accurate data for a given metric is selected.

5. The method of claim 2, wherein the at least one selection rule includes a rule in which a candidate authoritative data source that reports a high level of traffic activities for a particular site is chosen by the server as the authoritative data source of the particular site.

6. The method of claim 1, wherein the at least one selection rule includes a rule including a user designation of one or more data sources as the authoritative data source of a site and metric type.

7. The method of claim 1, wherein the at least one authoritative data source includes a plurality of authoritative data sources, and wherein generating the de-duplicated flow data includes aggregating flow data from the plurality of authoritative data sources.

8. The method of claim 1, wherein flow data are deduplicated by the server at a time of the query by matching the data source identifier and site identifier tags to authoritative data source identifiers of respective site identifiers.

9. The method of claim 8, wherein upon receiving a deduplication query for a particular site and a particular metric type, an authoritative data source database is queried to find an identifier of an authoritative data source associated with that particular site and metric type, and wherein a particular authoritative data source identifier is used as a filter to query a tagged flow data database.

10. The method of claim 1, further comprising:
performing a SQL INNER JOIN of an authoritative data source database and a tagged flow data database in response to receiving a deduplication query for multiple sites.

11. Logic encoded in one or more non-transitory tangible media that includes code for execution and when executed by a processor operable to perform operations, comprising:
receiving, by a server having a processor and memory, flow data associated with a traffic flow, the flow data tagged with a data source identifier identifying a data source exporting the flow data, a source site identifier identifying a source site associated with a source device of the traffic flow wherein the source site identifier identifies a geographical location of the source device, and a destination site identifier identifying a destination site associated with a destination device of the traffic flow wherein the destination site identifier identifies a geographical location of the destination device;
determining, by the server, at least one authoritative data source for each site and metric type using at least one selection rule;
receiving, by the server, a query for de-duplicated flow data, wherein the query includes a designation of a particular metric type and a designation of one of a source site identifier associated with a particular source site and a destination site identifier associated with a particular destination site; and
generating, by the server, de-duplicated flow data based on the particular metric type, data source identifier, source site identifier, destination site identifier and particular flow data associated with the determined at least one authoritative data source.

12. The logic of claim 11, wherein determining at least one authoritative data source includes generating a plurality of candidate authoritative data sources and applying the at least one selection rule to generate the at least one authoritative data source.

13. The logic of claim 12, wherein the at least one selection rule includes a rule in which a candidate authoritative data source that is local to a particular site is chosen as the authoritative data source of the particular site over a candidate authoritative data source that is remote to the particular site.

14. The logic of claim 12, wherein the at least one selection rule includes a rule in which a candidate authoritative data source providing the most accurate data for a given metric is selected.

15. The logic of claim 12, wherein the at least one selection rule includes a rule in which a candidate authoritative data source that reports a high level of traffic activities for a particular site is chosen by the server as the authoritative data source of the particular site.

16. The logic of claim 11, wherein the at least one selection rule includes a rule including a user designation of one or more data sources as the authoritative data source of a site.

17. The logic of claim 11, wherein the at least one authoritative data source includes a plurality of authoritative data sources, and wherein generating the de-duplicated flow data includes aggregating flow data from the plurality of authoritative data sources.

18. The logic of claim 11, wherein flow data are deduplicated by the server at a time of the query by matching the data source identifier and site identifier tags to authoritative data source identifiers of respective site identifiers.

19. The logic of claim 18, wherein upon receiving a deduplication query for a particular site and a particular metric type, an authoritative data source database is queried to find an identifier of an authoritative data source associated with that particular site and metric type, and wherein a particular authoritative data source identifier is used as a filter to query a tagged flow data database.

20. The logic of claim 11, the operations further comprising:
performing a SQL INNER JOIN of an authoritative data source database and a tagged flow data database in response to receiving a deduplication query for multiple sites.

21. An apparatus, comprising:
a memory element configured to store data,
a processor operable to execute instructions associated with the data, and
an authoritative data source detection module, the apparatus being configured to:
receive, by a server, flow data associated with a traffic flow, the flow data tagged with a data source identifier identifying a data source exporting the flow data, a source site identifier identifying a source site associated with a source device of the traffic flow wherein the source site identifier identifies a geographical location of the source device, and a destination site identifier identifying a destination site associated with a destination device of the traffic flow wherein the destination site identifier identifies a geographical location of the destination device;
determine, by the server, at least one authoritative data source for each site and metric type using at least one selection rule;
receive, by the server having a processor and memory, a query for de-duplicated flow data, wherein the query includes a designation of a particular metric type and a designation of one of a source site identifier associated with a particular source site and a destination site identifier associated with a particular destination site; and
generate, by the server, de-duplicated flow data based on the particular metric type, data source identifier, source site identifier, destination site identifier and particular flow data associated with the determined at least one authoritative data source.

22. The apparatus of claim 21, wherein determining at least one authoritative data source includes generating a plurality of candidate authoritative data sources and applying the at least one selection rule to generate the at least one authoritative data source.

23. The apparatus of claim 22, wherein the at least one selection rule includes a rule in which a candidate authoritative data source that is local to a particular site is chosen as the authoritative data source of the particular site over a candidate authoritative data source that is remote to the particular site.

24. The apparatus of claim 22, wherein the at least one selection rule includes a rule in which a candidate authoritative data source providing the most accurate data for a given metric is selected.

25. The apparatus of claim 22, wherein the at least one selection rule includes a rule in which a candidate authoritative data source that reports a high level of traffic activities for a particular site is chosen by the server as the authoritative data source of the particular site.

26. The apparatus of claim 21, wherein the at least one selection rule includes a rule including a user designation of one or more data sources as the authoritative data source of a site.

27. The apparatus of claim 21, wherein the at least one authoritative data source includes a plurality of authoritative data sources, and wherein generating the de-duplicated flow data includes aggregating flow data from the plurality of authoritative data sources.

28. The apparatus of claim 21, wherein flow data are deduplicated by the server at a time of the query by matching the data source identifier and site identifier tags to authoritative data source identifiers of respective site identifiers.

29. The apparatus of claim 28, wherein upon receiving a deduplication query for a particular site and a particular metric type, an authoritative data source database is queried to find an identifier of an authoritative data source associated with that particular site and metric type, and wherein a particular authoritative data source identifier is used as a filter to query a tagged flow data database.

30. The apparatus of claim 21, the apparatus being further configured to:
perform a SQL INNER JOIN of an authoritative data source database and a tagged flow data database in response to receiving a deduplication query for multiple sites.

* * * * *